US012789994B2

(12) United States Patent
Brown et al.

(10) Patent No.: US 12,789,994 B2
(45) Date of Patent: Nov. 10, 2026

(54) HELICOPTER EXTERNAL CARGO HOOK WITH DUAL LOAD BEAMS

(71) Applicant: Mechanical Specialties, Olympia, WA (US)

(72) Inventors: Tim Brown, Lacey, WA (US); Rob Schales, Lacey, WA (US); Tom Spithaler, Tenino, WA (US); Jeff Winner, Olympia, WA (US)

(73) Assignee: MECHANICAL SPECIALTIES, LLC, Olympia, WA (US)

( * ) Notice: Subject to any disclaimer, the term of this patent is extended or adjusted under 35 U.S.C. 154(b) by 919 days.

(21) Appl. No.: 18/118,098

(22) Filed: Mar. 6, 2023

(65) Prior Publication Data

US 2024/0300647 A1 Sep. 12, 2024

(51) Int. Cl.

*B64D 1/22* (2006.01)
*B64C 27/04* (2006.01)
*B66C 1/34* (2006.01)

(52) U.S. Cl.

CPC ................ *B64D 1/22* (2013.01); *B64C 27/04* (2013.01); *B66C 1/34* (2013.01)

(58) Field of Classification Search

CPC .. B64C 27/04; B64D 1/08; B64D 1/22; B66C 1/22; B66C 1/34

See application file for complete search history.

(56) References Cited

U.S. PATENT DOCUMENTS

| | | | |
|---|---|---|---|
| 5,593,113 A | 1/1997 | Cox | |
| 5,850,991 A | 12/1998 | Hainsworth et al. | |
| 6,189,834 B1 | 2/2001 | Dietz et al. | |
| 8,172,184 B2 | 5/2012 | Spencer et al. | |
| 9,027,976 B1 * | 5/2015 | Tollenaere | B66C 1/127 294/75 |
| 2006/0175851 A1 | 8/2006 | Snyder | |
| 2009/0072562 A1 * | 3/2009 | Brunner | B66C 1/36 294/82.2 |
| 2018/0111687 A1 * | 4/2018 | Thomas | B64D 1/22 |
| 2020/0361750 A1 | 11/2020 | Autissier et al. | |
| 2023/0322384 A1 | 10/2023 | Hamelin et al. | |
| 2024/0278917 A1 * | 8/2024 | Behrens | B64D 1/22 |

FOREIGN PATENT DOCUMENTS

| | | |
|---|---|---|
| EP | 3176086 A1 | 6/2017 |
| FR | 3146460 A1 | 9/2024 |
| WO | 2022058687 A1 | 3/2022 |
| WO | 2024184610 A1 | 9/2024 |
| WO | 2025195924 A1 | 9/2025 |

* cited by examiner

*Primary Examiner* — Gilbert Y Lee
(74) *Attorney, Agent, or Firm* — Jason Aldred

(57) ABSTRACT

A helicopter external cargo hook with dual load beams and a pair of separately independent internal mechanisms configured with multiple releases for rotating each load beam from a closed position to an open position.

13 Claims, 10 Drawing Sheets

HELICOPTER EXTERNAL CARGO HOOK WITH DUAL LOAD BEAMS

BACKGROUND

This disclosure relates generally, to helicopter cargo hook embodiments and more particularly, to singular housed helicopter cargo hook embodiments having dual load beams.

Accidental or inadvertent release of cargo hook loads can result in serious harm or death. These accidental or inadvertent releases can be due to errors that may include, but are not limited to restraint of the mechanical release cable, incorrect mechanical release cable, incorrect rigging, or an accidental triggering of the cargo hook release controls by the pilot. Accordingly, a need exists for helicopter external cargo hooks to minimize and even avoid accidental or inadvertent cargo load releases.

SUMMARY

A helicopter external cargo hook including a housing having a first internal mechanism and a second internal mechanism, wherein the housing defines a housing axis oriented vertically to divide the first internal mechanism and the second internal mechanism. The first internal mechanism defines a first compartment formed within the housing and the second internal mechanism defines a second compartment formed within the housing. The first internal mechanism and the second internal mechanism constructed in mirror image of one another. The helicopter external cargo hook also including a pair of load beams. The pair of load beams including a first load beam in operable connection to the first internal mechanism and a second load beam in operable connection to the second internal mechanism. The helicopter external cargo hook further including a release axis oriented horizontally and perpendicular to the housing axis, wherein the first load beam lockably rotatable about the release axis upon actuation of the first internal mechanism and the second load beam lockably rotatable about the release axis upon actuation of the second internal mechanism.

In accordance with an embodiment, the first internal mechanism of the housing includes a first electrical release, a first mechanical release, and a first manual actuation, each mounted in a fixed position to the housing and the second internal mechanism of the housing includes a second electrical release, a second mechanical release, and a second manual actuation, each mounted in a fixed position to the housing.

In variations of the helicopter external cargo hook, the first electrical release and the second electrical release each include a solenoid actuated from the cockpit. In addition, the first mechanical release and the second mechanical release each include a mechanical release switch operably coupled to a manual release cable actuated from the cockpit. Furthermore, the first manual actuation and the second manual actuation each include the mechanical release switch actuated by ground personnel.

Other advantages, features, and functions of embodiments of a helicopter external cargo hook having the features discussed herein will become readily apparent and better understood in view of the following description and accompanying drawings. The following description is not intended to limit the scope of the helicopter external cargo hook, but instead merely provides exemplary embodiments for ease of understanding.

BRIEF DESCRIPTION OF THE DRAWINGS

Corresponding reference numerals indicate corresponding parts throughout the several views of the drawings.

Figure 1:
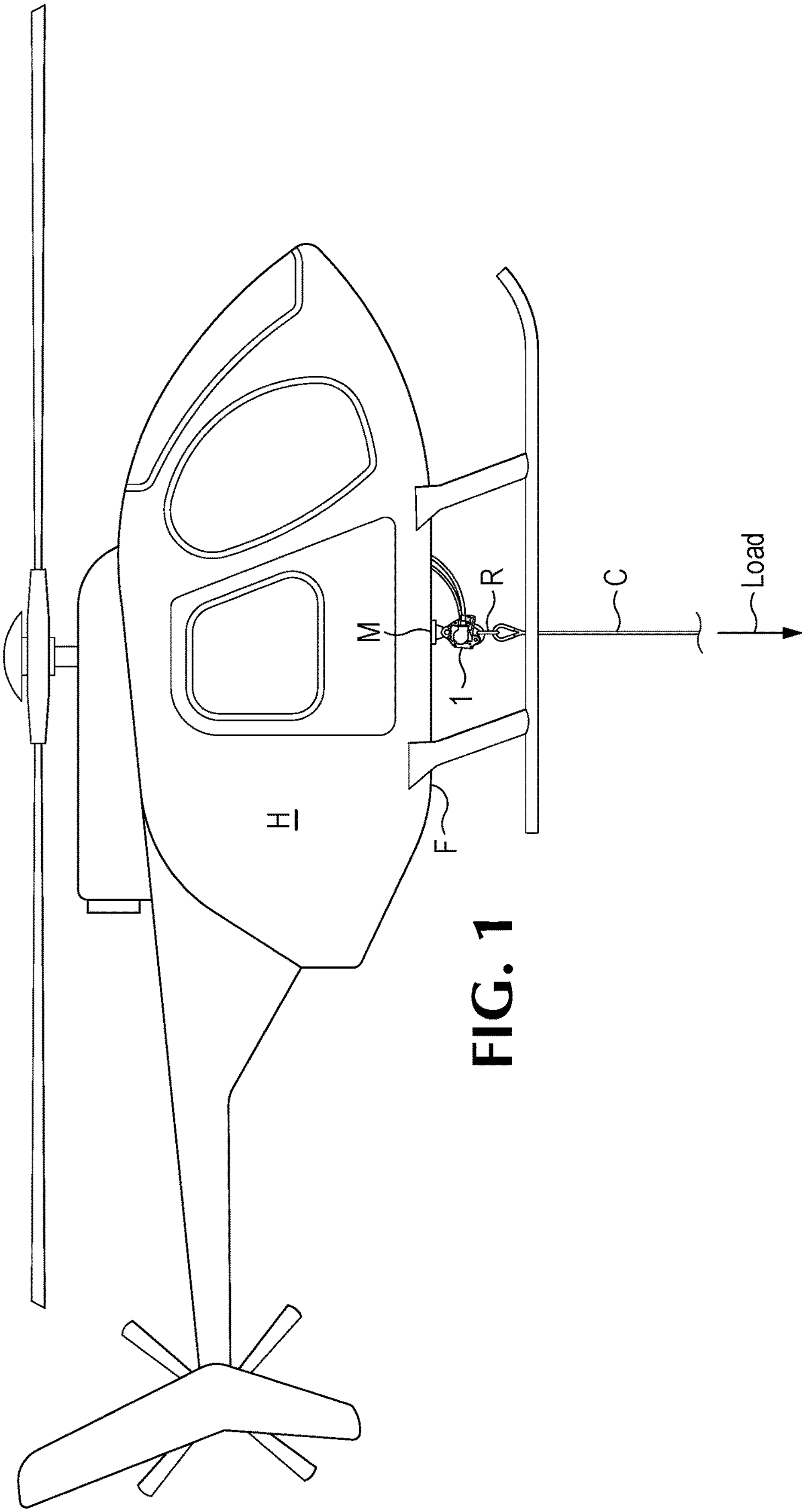
FIG. 1 is left, side view of a helicopter external cargo hook mounted to the fuselage under belly of a helicopter, in accordance with implementations of the present disclosure.

The drawings described herein are for illustrative purposes only of select embodiments and not all possible implementations. The drawing figures are not necessarily drawn to scale, but instead are drawn to provide a better understanding of the components thereof, and are not intended to be limiting in scope, but rather to provide exemplary illustrations. According to the present disclosure, the figures illustrate exemplary embodiments of a helicopter external cargo hook and the components thereof, and in no way limit the structures or configurations employed by other cargo hooks, and their components thereof.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Figure 2:
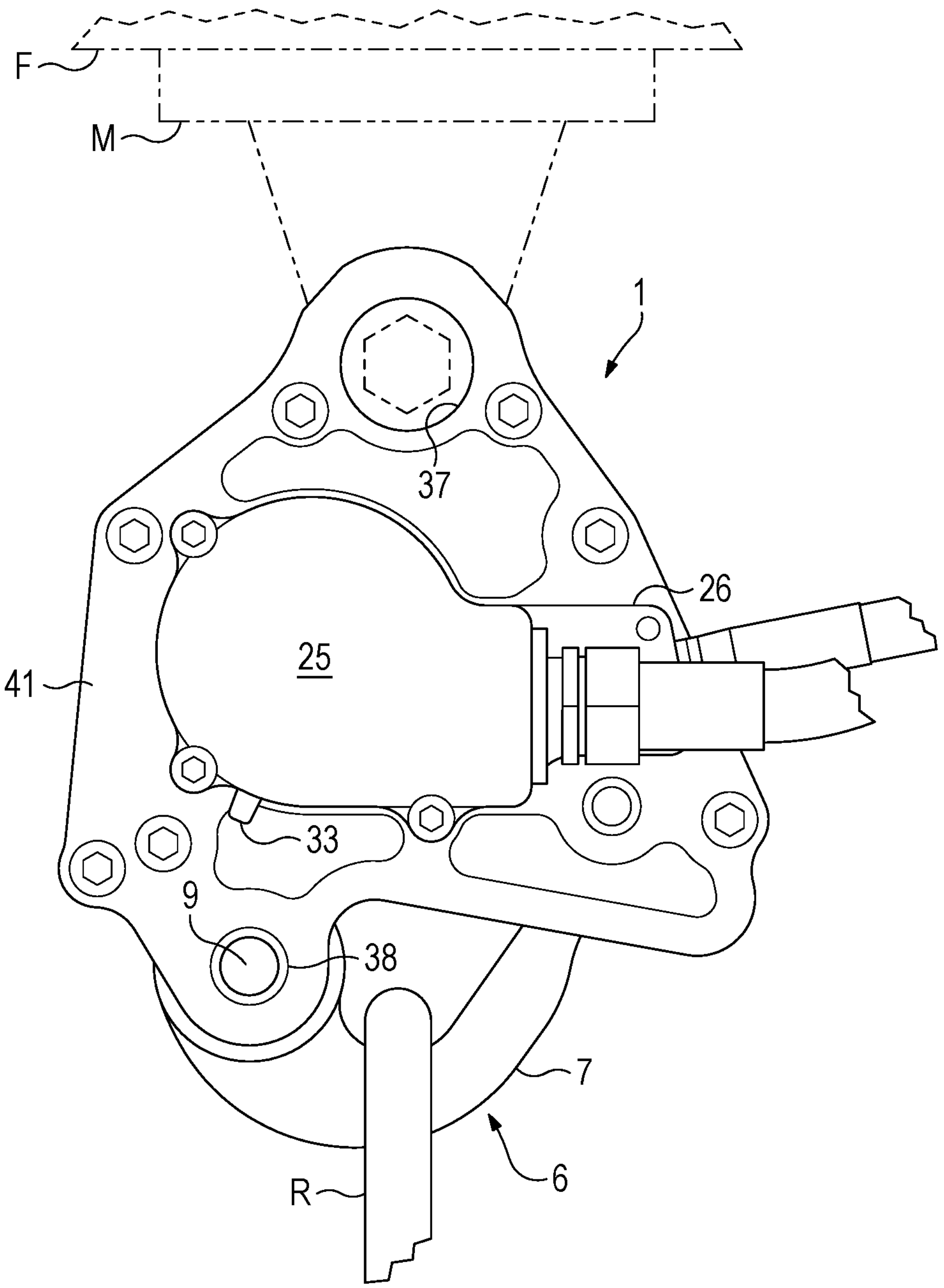
FIG. 2 is a left, side view illustrating the helicopter external cargo hook as mounted, in accordance with implementations of the present disclosure.

Now referring to the figures wherein like reference numerals denote like structure throughout the specification, with reference primarily to FIG. 1 through FIG. 2, which depicts a helicopter external cargo hook 1 coupled to a cargo hook mount M on the underside of the fuselage F of a helicopter H. A cargo load (not shown) is suspended from the helicopter external cargo hook 1 with load cable C which is connected to the helicopter external cargo hook 1 by way of ring R. In various embodiments of the present disclosure, a cargo load can be conveyed and transported to accessible and remote locations, with or without a ground crew, depending on the situation. Such high value cargo loads can consist of humans, ammunition, armored fighting vehicles, food and water, medical supplies, and any other object that can be subjected to aerial transport while suspended from a helicopter.

Figure 3:
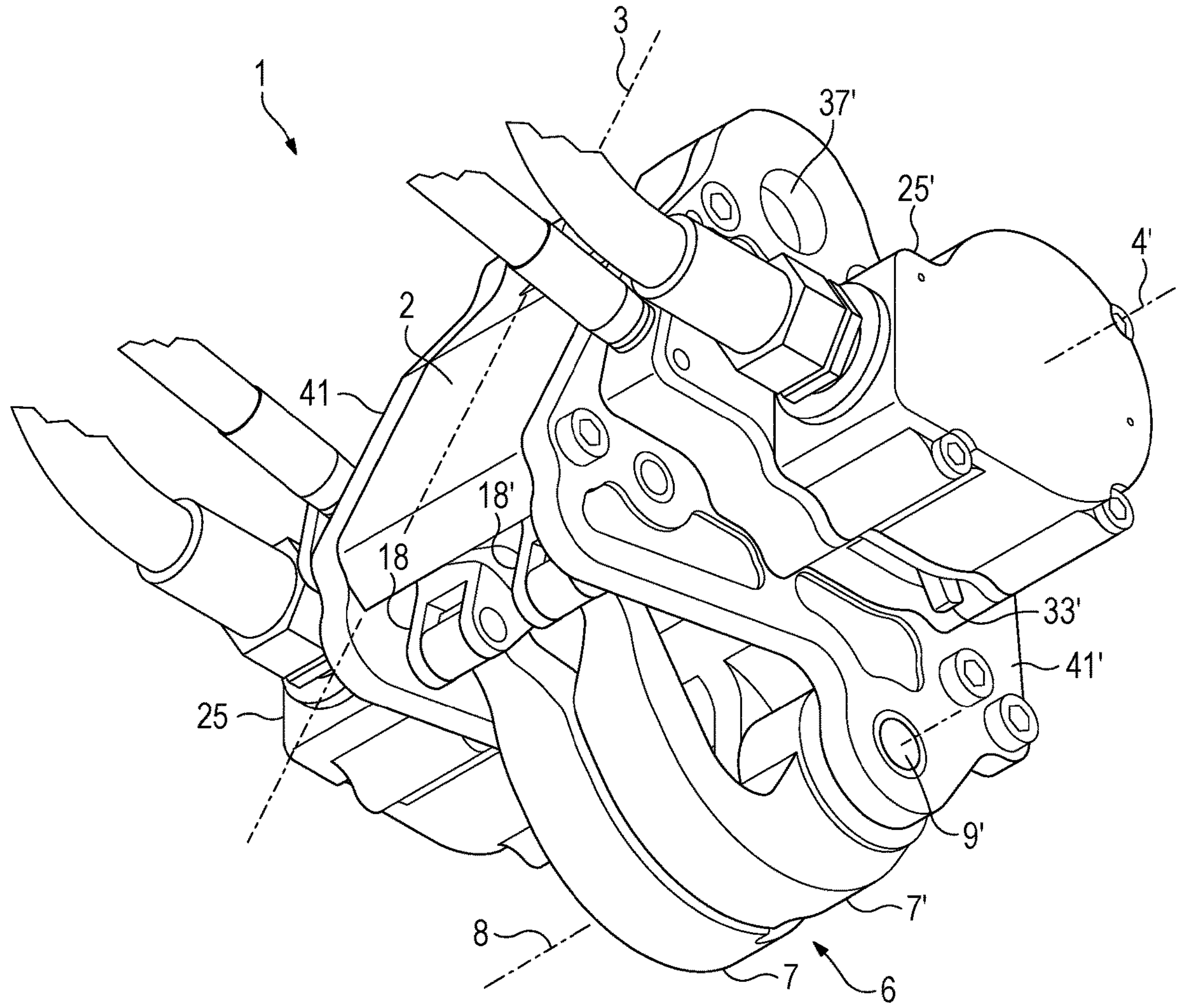
FIG. 3 is a bottom, right, perspective view of a helicopter external cargo hook, according to an embodiment of the present disclosure.

With reference now, primarily to FIG. 3, helicopter external cargo hook 1 includes a housing 2, a first internal mechanism 4, a second internal mechanism 4', and a housing axis 3, which is oriented vertically to divide the first internal mechanism 4 and the second internal mechanism 4'. In addition, the first internal mechanism 4 defines a first compartment 5 formed within the housing 2 and the second internal mechanism 4' defines a second compartment 5' formed also, within the housing 2. The first internal mechanism 4 and the second internal mechanism 4' are constructed in the mirror image of one another and each of the first and the second internal mechanisms 4, 4' independently operable from one another.

With continuing reference primarily to FIG. 3, helicopter external cargo hook 1 includes a pair of load beams 6 or dual load beams 6. The pair of load beams 6 includes a first load beam 7 in operable connection to the first internal mechanism 4 and a second load beam 7' in operable connection to the second internal mechanism 4'. A release axis 8 is oriented horizontally and perpendicular to the housing axis 3. The first load beam 7 can be lockably rotatable about the release axis 8 upon actuation of the first internal mechanism 4 and the second load beam 7' can be lockably rotatable about the release axis 8 upon actuation of the second internal mechanism 4'.

Still with continuing reference to FIG. 3, housing 2 can, but not necessarily, be generally or approximately cuboidal in shape with mount eyelets 37, 37', release eyelets 38, 38', and side plates 41, 41'. The illustrative example of the shape of the helicopter external cargo hook 1 is not intended to preclude embodiments which incorporate similar or equivalent cargo hook shapes that facilitate operation of electrical, mechanical, and manual actuation release systems, currently or prospectively available. Additionally, housing 2 can, but not necessarily, be made of corrosion-resistant stainless steel. The commercially available example of the manufacturing materials of the housing 2 is not intended to preclude embodiments which incorporate similar or equivalent cargo hooks and cargo load beams that facilitate aerial transport of cargo loads, currently or prospectively available.

Figure 4A:
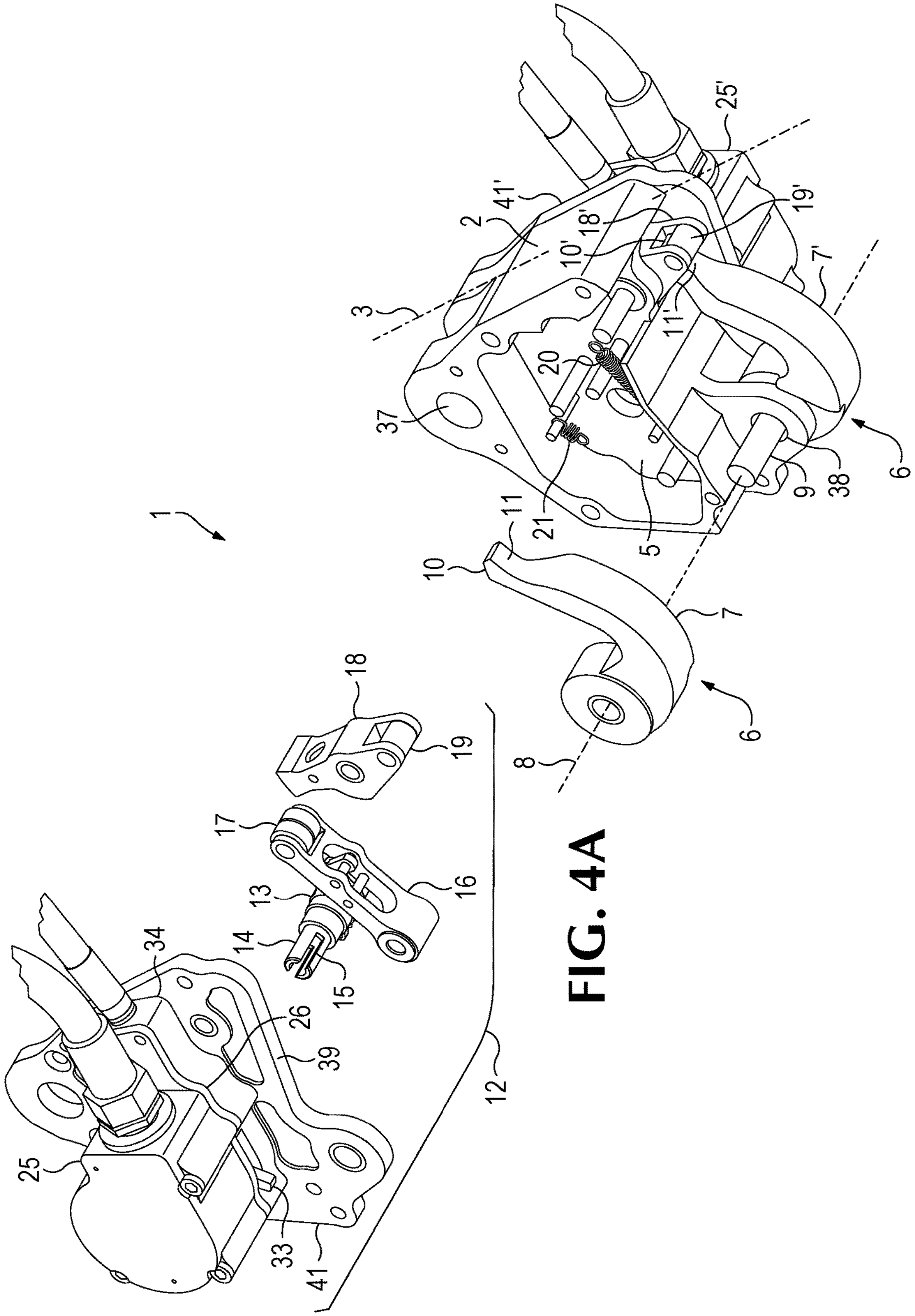
FIG. 4A is an exploded view of an embodiment of the helicopter external cargo, featuring the electrical release, according to an embodiment of the present disclosure.
Figure 5:
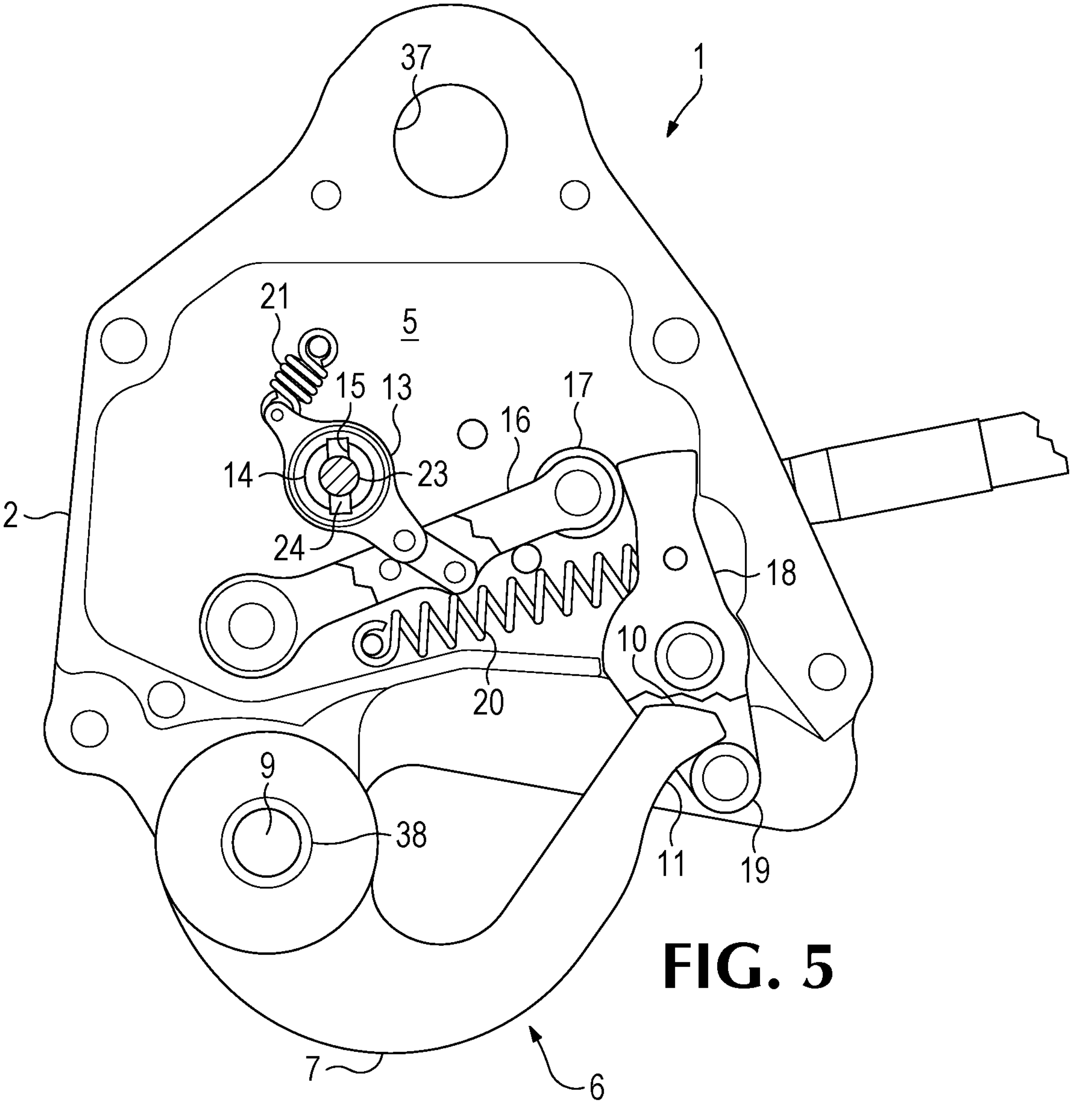
FIG. 5 is a left, side view of the electrical release of the helicopter external cargo hook with the load beam in a closed position, according to an embodiment of the present disclosure.
Figure 6:
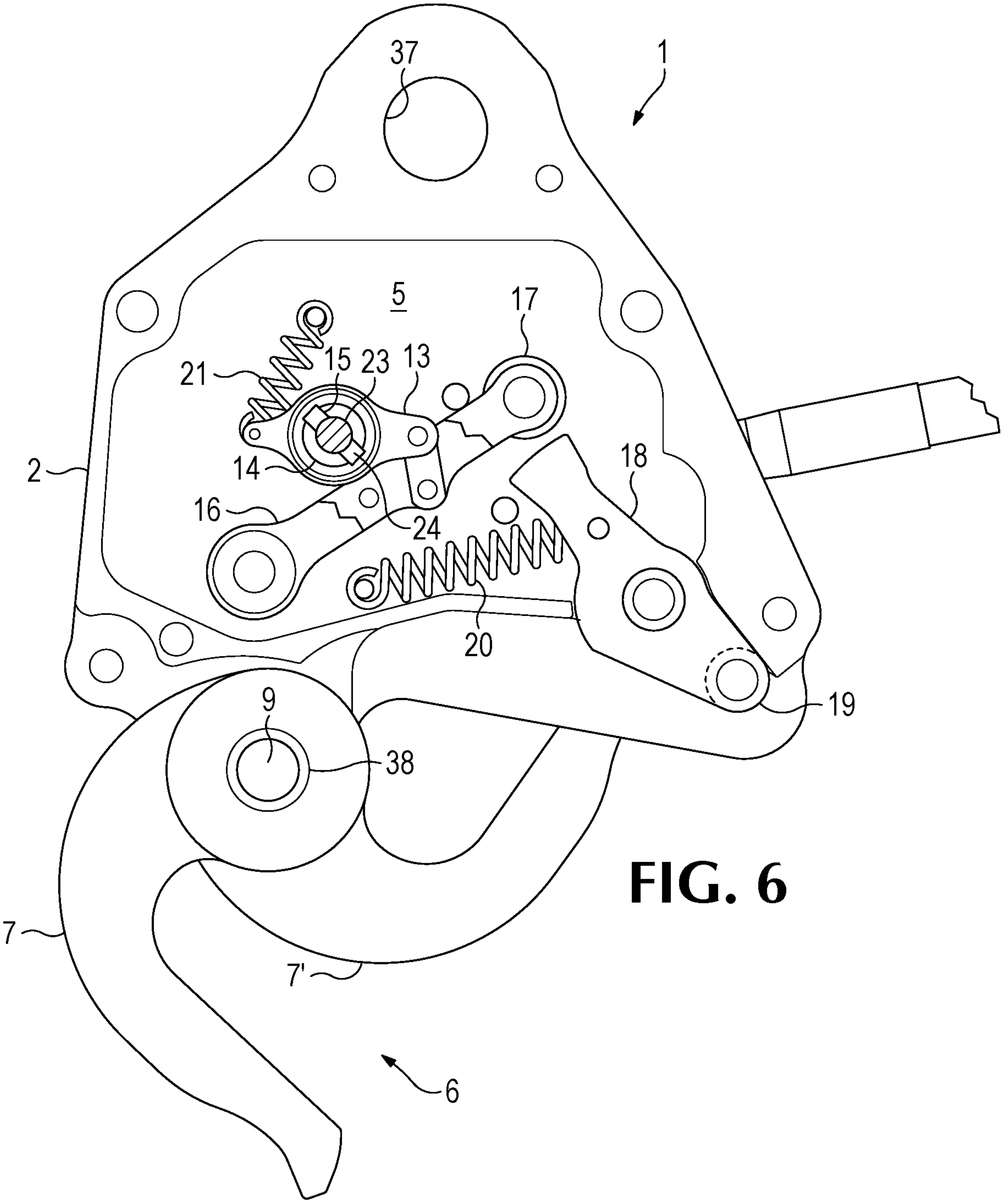
FIG. 6 is a left, side view of the electrical release of the helicopter external cargo hook with the load beam in an open position, according to an embodiment of the present disclosure.

With reference now, primarily to FIG. 4A, FIG. 5 and FIG. 6, load beam pin 9 enables the rotation of the pair of load beams 6 or individually, first load beam 7 and second load beam 7' about release axis 8. Load beam tips 10, 10' and load beam recesses 11, 11' interface with locking pieces 18, 18' of the shaft and arm assemblies 13, 13'.

With continuing reference, primarily to FIG. 4A, FIG. 5 and FIG. 6, first electrical release 12 and second electrical release 12' each include a shaft and arm assembly 13, 13' made up of drive shaft receiver 14, 14', shaft notch 15, 15', arm 16, 16', roller 17, 17', locking piece 18, 18', catch 19, 19', lock spring 13, 13', and shaft and arm spring 13, 13'. The first and second electrical releases 12, 12' each include a solenoid 22, 22'. Solenoid 22, 22' can, but not necessarily, be a commercially available rotary-type solenoid. The illustrative and commercially available examples of the solenoid 22, 22' are not intended to preclude embodiments which incorporate similar or equivalent electric motors, cam shafts with lifter plates, cranks, crank substitutes, or other solenoids currently or prospectively available.

Solenoids 22, 22' each include a drive shaft 23, 23', shaft pin 24, 24', (which is disposed into and through the drive shaft 23, 23') solenoid housing and cable 25, 25', solenoid plate 26, 26', plate aperture 27, 27'. Upon activation of first electrical release 12 and/or second electrical release 12' each shaft and arm assembly 13, 13' displaces each locking piece 18, 18' of the shaft and arm assembly 13, 13', thereby causing the corresponding load beam 7, 7' to open and release the cargo load attached.

Figure 4B:
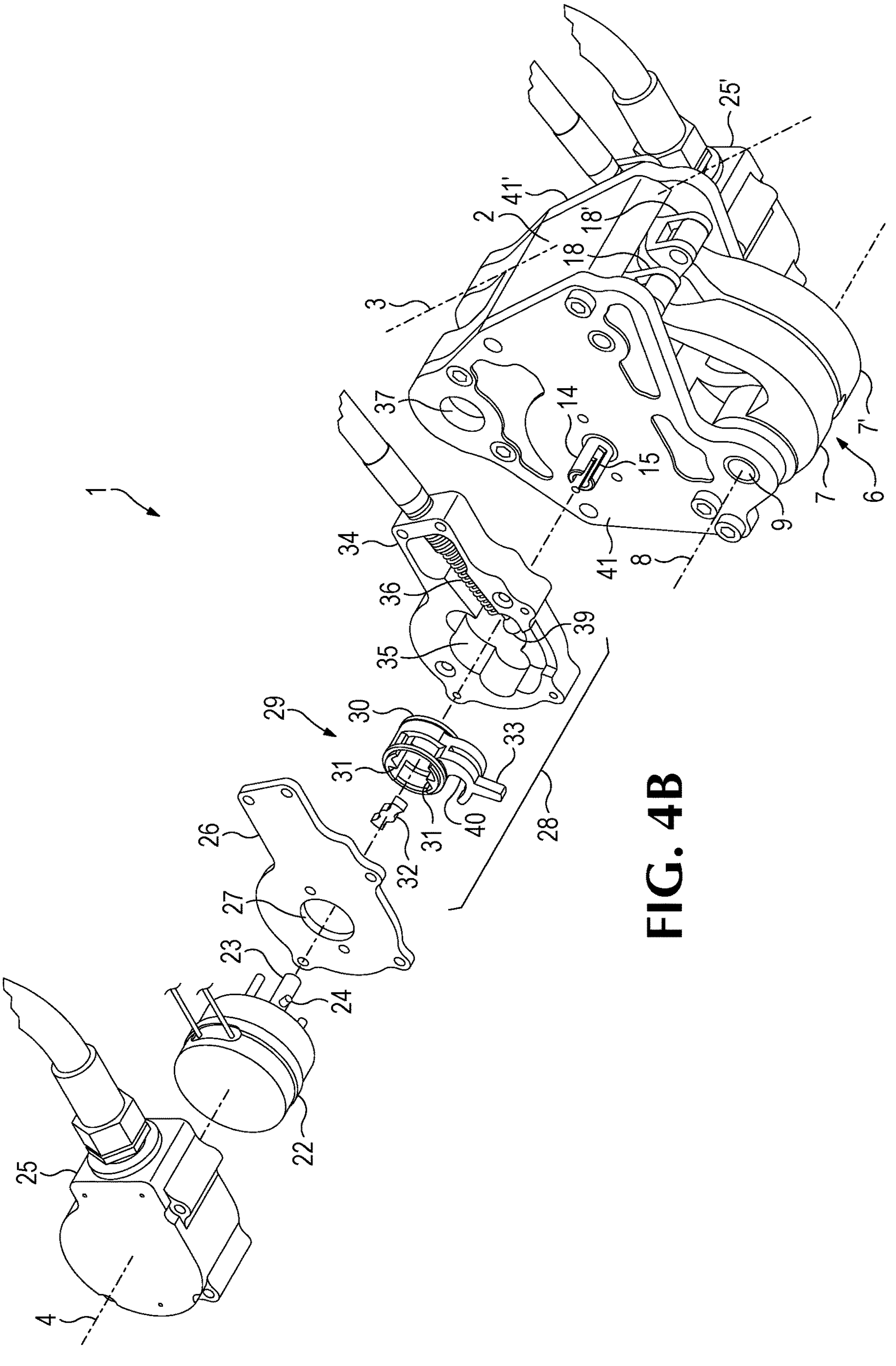
FIG. 4B is an exploded view of an embodiment of the helicopter external cargo, featuring the mechanical release and the manual actuation release, according to an embodiment of the present disclosure.
Figure 7:
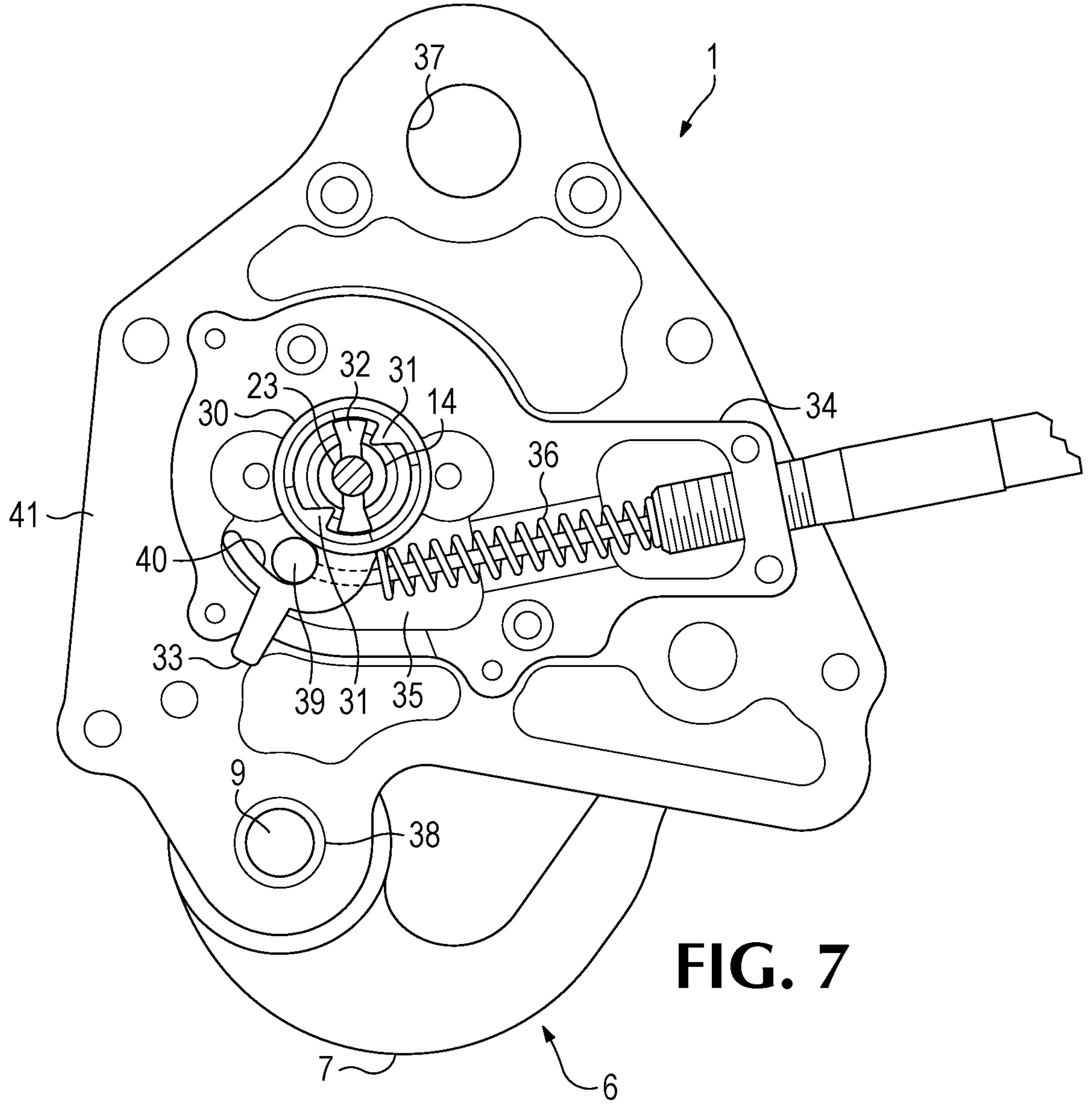
FIG. 7 is a left, side view of the mechanical release and manual actuation release of the helicopter external cargo hook with the load beam in the closed position, according to an embodiment of the present disclosure.
Figure 8:
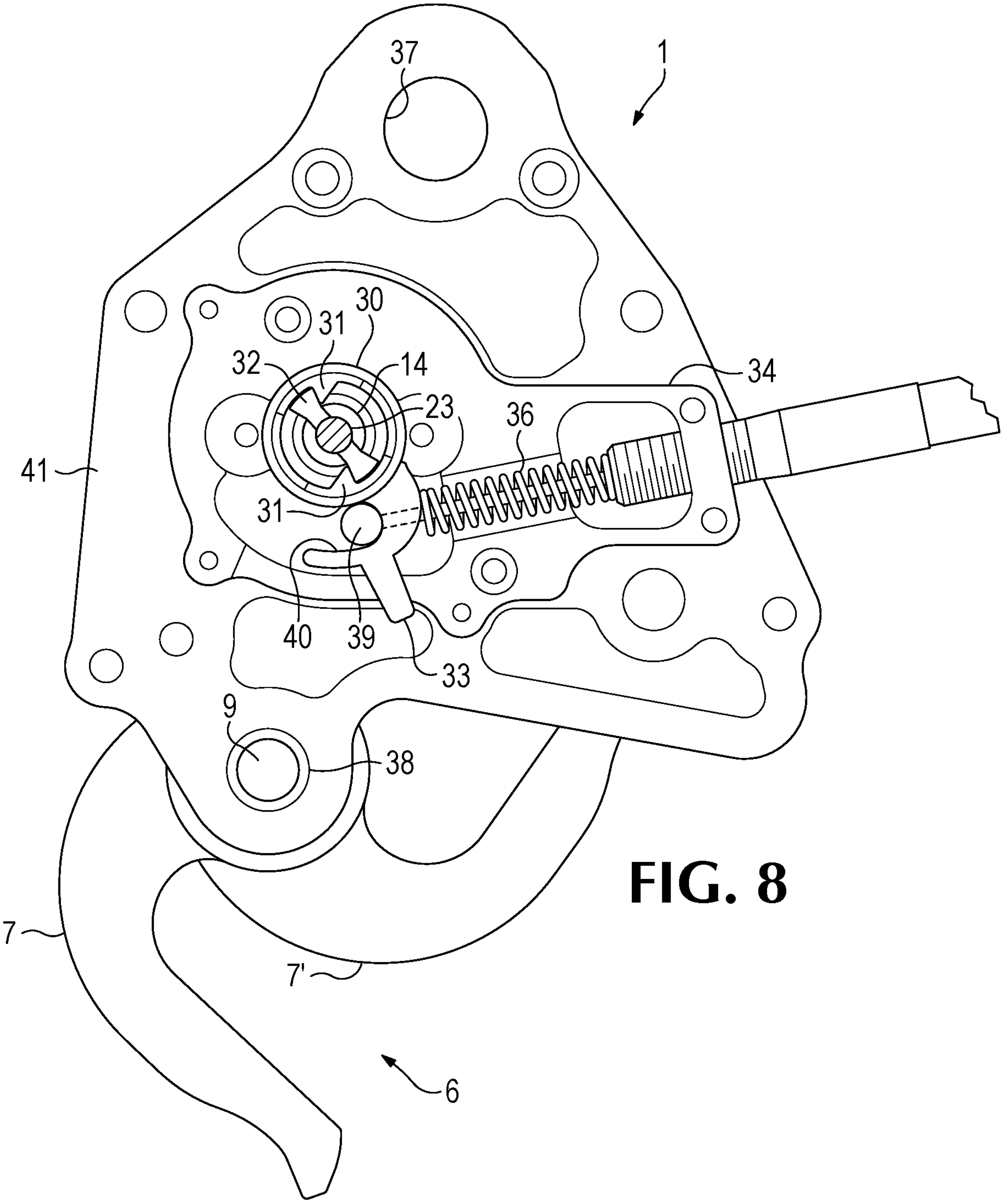
FIG. 8 is a left, side view of the mechanical release and manual actuation release of the helicopter external cargo hook with the load beam in the open position, according to an embodiment of the present disclosure.

With reference now primarily to FIG. 4B, FIG. 7 and FIG. 8, first mechanical release 28 and second mechanical release 28', as well as first manual actuation 29 and second manual actuation 29' each include a drum 30, 30', (which is made up of jagged side walls 31, 31'), a dog bone-shaped member 32, 32', (which includes side walls corresponding to the jagged side walls 31, 31'), manual switch 33, 33', manual release cable 34, 34', manual release compartment 35, 35', manual release spring 36, 36', manual release spring tether 39, 39', and manual switch slot 40, 40'. The illustrative and commercially available examples of the first mechanical release 28 and second mechanical release 28', as well as first manual actuation 29 and second manual actuation 29' are not intended to preclude embodiments which incorporate similar or equivalent levers, handles, pedals, and cabled springs currently or prospectively available.

Figure 9:
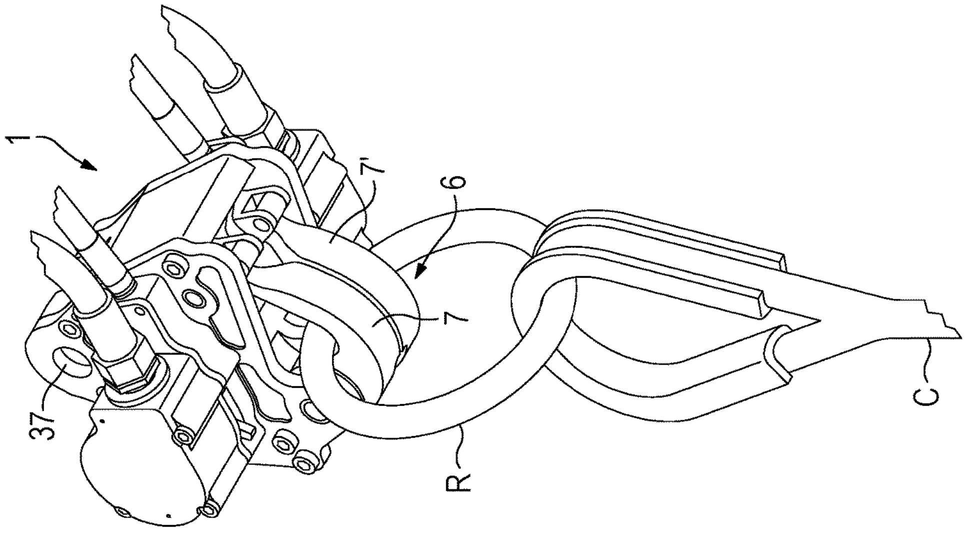
FIG. 9 is bottom, left, perspective view of a helicopter external cargo hook with dual load beams in the closed position, in accordance with implementations of the present disclosure.
Figure 10:
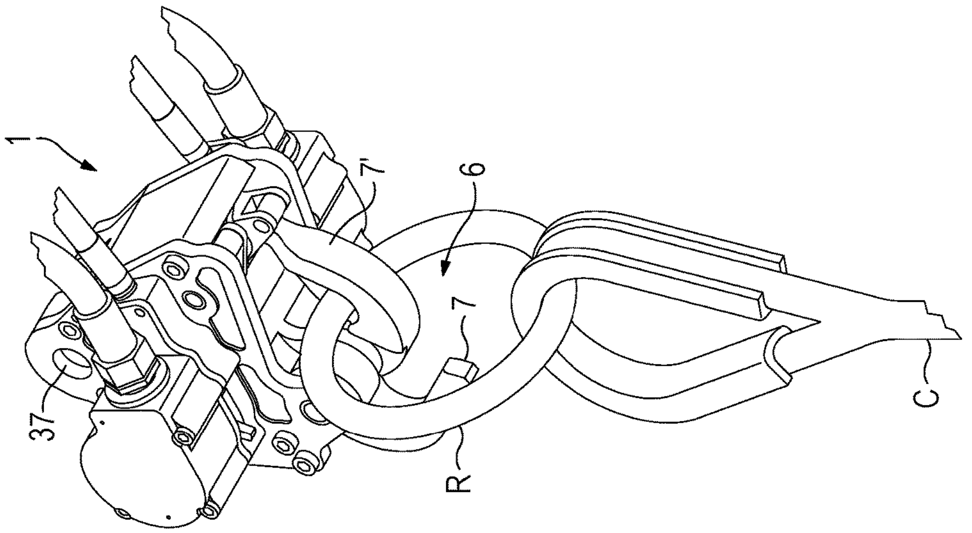
FIG. 10 is bottom, left, perspective view of a helicopter external cargo hook with one of the dual load beams in the open position and the other load beam in the closed position, in accordance with implementations of the present disclosure.
Figure 11:
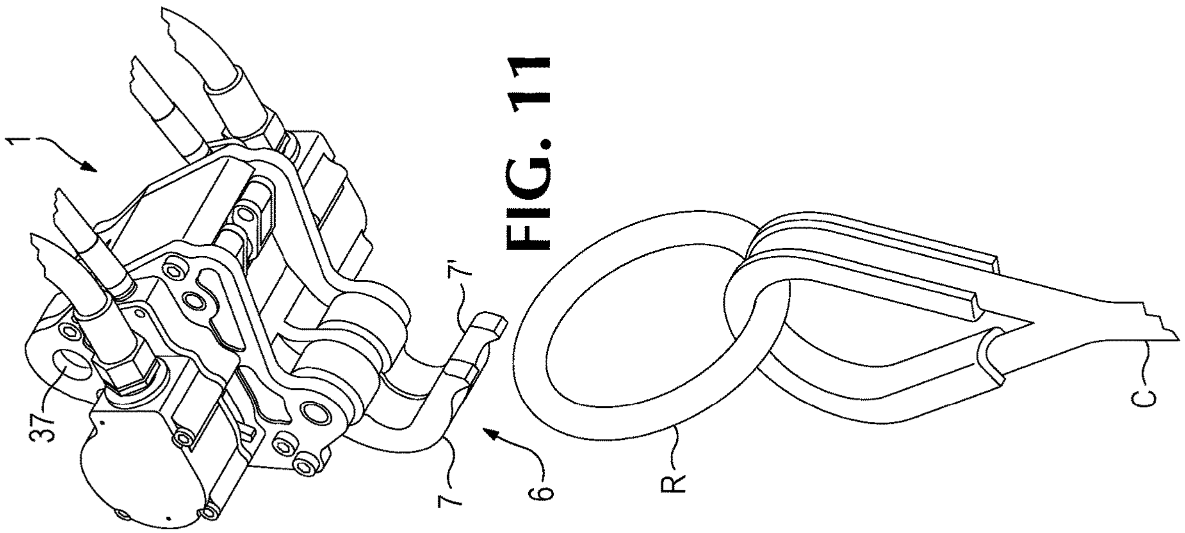
FIG. 11 is bottom, left, perspective view of a helicopter external cargo hook with the dual load beams in the open position, in accordance with implementations of the present disclosure.

Referring primarily to FIG. 9 through FIG. 11, the helicopter external cargo hook 1, the first electrical release 12 and the second electrical release 12' can be actuated from the cockpit, the first mechanical release 28 and the second mechanical release 28' can also be actuated from the cockpit, and the first manual actuation 29 and the second manual actuation 29' can be actuated by ground personnel.

The present teachings thus advantageously provide for a helicopter external cargo hook 1 used for aerial transport. The present teachings provide for numerous other advantages as well, as will be recognized by one skilled in the art.

The description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, quadrants, thirds, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 routes refers to groups having 1, 2, or 3 routes. Similarly, a group having 1-5 impact zones, for example, refers to groups having 1, 2, 3, 4, or 5 impact zones and more or less, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A helicopter external cargo hook, comprising:

a housing, the housing comprising a first internal mechanism and a second internal mechanism, wherein the housing defines a housing axis oriented vertically to divide the first internal mechanism and the second internal mechanism, the first internal mechanism defines a first compartment formed within the housing, the second internal mechanism defines a second compartment formed within the housing, the first internal mechanism and the second internal mechanism in mirror image of one another;

a pair of load beams, comprising a first load beam in operable connection to the first internal mechanism and a second load beam in operable connection to the second internal mechanism, wherein when the first load beam fails or is accidentally triggered, the second load beam remains secure in operable connection; and a release axis oriented horizontally, the release axis perpendicular to the housing axis, wherein the first load beam lockably rotatable about the release axis upon actuation of the first internal mechanism and the second load beam lockably rotatable about the release axis upon actuation of the second internal mechanism, wherein the first load beam and the second load beam are co-axially mounted within the housing about the release axis, the release axis passing through both the first internal mechanism and the second internal mechanism.

2. The helicopter external cargo hook of claim 1, wherein the first internal mechanism of the housing comprises a first electrical release, a first mechanical release, and a first manual actuation, each mounted in a fixed position to the housing.

3. The helicopter external cargo hook of claim 2, wherein the second internal mechanism of the housing comprises a second electrical release, a second mechanical release, and a second manual actuation, each mounted in a fixed position to the housing.

4. The helicopter external cargo hook of claim 3, wherein the first electrical release and the second electrical release each comprise a solenoid actuated from a cockpit.

5. The helicopter external cargo hook of claim 4, wherein the first mechanical release and the second mechanical release each comprise a mechanical release switch operably coupled to a manual release cable actuated from the cockpit.

6. The helicopter external cargo hook of claim 5, wherein the first manual actuation and the second manual actuation each comprise the mechanical release switch actuated by ground personnel.

7. The helicopter external cargo hook of claim 1, wherein an external cargo is a human external cargo (HEC).

8. The helicopter external cargo hook of claim 1 wherein the first internal mechanism and the second internal mechanism must both be each independently and deliberately actuated to jettison a load.

9. A helicopter external cargo hook, comprising:

a housing, the housing comprising a first internal mechanism and a second internal mechanism, wherein the housing defines a housing axis oriented vertically to divide the first internal mechanism and the second internal mechanism, the first internal mechanism defines a first compartment formed within the housing, the second internal mechanism defines a second compartment formed within the housing, the first internal mechanism and the second internal mechanism in mirror image of one another;

a pair of load beams, comprising a first load beam in operable connection to the first internal mechanism and a second load beam in operable connection to the second internal mechanism, wherein when the first load beam fails or is accidentally triggered, the second load beam remains secure in operable connection; and a release axis oriented horizontally, the release axis perpendicular to the housing axis, wherein the first load beam lockably rotatable about the release axis upon actuation of the first internal mechanism and the second load beam lockably rotatable about the release axis upon actuation of the second internal mechanism, wherein the first load beam and the second load beam are co-axially mounted within the housing about the release axis, the release axis passing through both the first internal mechanism and the second internal mechanism;

wherein the first internal mechanism of the housing comprises a first electrical release and wherein the second internal mechanism of the housing comprises a second electrical release, each of the first electrical release and the second electrical release is a solenoid actuated from a cockpit.

10. The helicopter external cargo hook of claim 9, wherein the first internal mechanism of the housing comprises a first mechanical release and wherein the second internal mechanism of the housing comprises a second mechanical release, each of the first mechanical release and the second mechanical release is a mechanical release switch operably coupled to a manual release cable actuated from the cockpit.

11. The helicopter external cargo hook of claim 10, wherein the first internal mechanism of the housing comprises a first manual actuation and wherein the second internal mechanism of the housing comprises a second manual actuation, each of the first manual actuation and the second manual actuation is the mechanical release switch actuated by ground personnel.

12. The helicopter external cargo hook of claim 9, wherein an external cargo is a human external cargo (HEC).

13. The helicopter external cargo hook of claim 9, wherein the first internal mechanism and the second internal mechanism must both be each independently and deliberately actuated to jettison a load.

* * * * *